United States Patent
Dounia et al.

(10) Patent No.: US 12,442,875 B2
(45) Date of Patent: Oct. 14, 2025

(54) MAGNETIC SENSOR DEVICE HAVING AN IMPROVED MEASUREMENT RANGE

(71) Applicants: Allegro MicroSystems, LLC, Manchester, NH (US); COMMISSARIAT À L'ÉNERGIE ATOMIQUE ET AUX ÉNERGIES ALTERNATIVES, Paris (FR)

(72) Inventors: Salim Dounia, Grenoble (FR); Claire Baraduc, Chirens (FR)

(73) Assignees: Allegro MicroSystems, LLC, Manchester, NH (US); COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 159 days.

(21) Appl. No.: 18/553,000

(22) PCT Filed: Mar. 8, 2022

(86) PCT No.: PCT/IB2022/052046
§ 371 (c)(1),
(2) Date: Sep. 28, 2023

(87) PCT Pub. No.: WO2022/208192
PCT Pub. Date: Oct. 6, 2022

(65) Prior Publication Data
US 2024/0192291 A1  Jun. 13, 2024

(30) Foreign Application Priority Data
Mar. 29, 2021 (EP) .................................... 21315054

(51) Int. Cl.
*G01R 33/09* (2006.01)
*G01R 33/00* (2006.01)

(52) U.S. Cl.
CPC ....... *G01R 33/098* (2013.01); *G01R 33/0005* (2013.01); *G01R 33/0094* (2013.01)

(58) Field of Classification Search
CPC .............. G01R 33/098; G01R 33/0005; G01R 33/0094; H01F 10/3254; G11C 11/161
See application file for complete search history.

(56) References Cited

U.S. PATENT DOCUMENTS

| | | | |
|---|---|---|---|
| 2017/0212189 A1* | 7/2017 | Holm | G01R 33/0005 |
| 2017/0276740 A1* | 9/2017 | Schmitt | G01R 33/091 |

(Continued)

FOREIGN PATENT DOCUMENTS

| | | |
|---|---|---|
| WO | 2020217195 A1 | 10/2020 |
| WO | 2020250489 A1 | 12/2020 |

OTHER PUBLICATIONS

European Examination Report dated Feb. 21, 2025 for European Application No. 21315054.3; 5 Pages.

(Continued)

*Primary Examiner* — Alvaro E Fortich
(74) *Attorney, Agent, or Firm* — DALY, CROWLEY, MOFFORD & DURKEE, LLP (57) ABSTRACT

A magnetic sensor device comprising a plurality of magnetic sensor elements; each magnetic sensor element including a magnetic tunnel junction including a reference layer having a reference magnetization, a sense layer having a sense magnetization and a tunnel barrier layer; the sense magnetization comprising a stable vortex configuration in the absence of an external magnetic field, the vortex having a core reversibly movable in a plane (P) of the sense layer according to an external magnetic field; the sense layer including a peripheral shape in the plane (P), the peripheral shape including an asymmetric edge portion; the magnetic sensor elements being arranged such that the edge portion of (Continued)

a magnetic sensor element is opposite to the edge portion of the adjacent magnetic sensor element.

12 Claims, 5 Drawing Sheets

(56) References Cited

U.S. PATENT DOCUMENTS

2018/0321334 A1* 11/2018 Deak ................ G01R 33/0011
2018/0356474 A1* 12/2018 Hammerschmidt ........................
                                                          H01F 10/3254
2022/0050151 A1*  2/2022 Timopheev .......... G01R 33/098

OTHER PUBLICATIONS

Response to European Examination Report dated Feb. 21, 2025 for European Application No. 21315054.3; Response Filed Mar. 25, 2025; 28 Pages.
The International Search Report and Written Opinion issued in corresponding International PCT Application No. PCT/IB2022/052046; Mailing Date: Jun. 3, 2022.
Yue Zheng, et al.; Characteristics and controllability of vortices in ferromagnetics, ferroelectrics, and multiferroics, Reports on Progress in Physics, Institute of Physics Publishing, vol. 80, No. 8, Jun. 2, 2017.

* cited by examiner

MAGNETIC SENSOR DEVICE HAVING AN IMPROVED MEASUREMENT RANGE

TECHNICAL DOMAIN

The present invention is related to the field of magnetic sensors and magnetic sensors based on magnetic tunnel junctions. More particularly, the present invention concerns a magnetic element having a linear and non-hysteretic behavior in a large measurement range.

RELATED ART

A magnetization vortex is a coherent magnetic configuration in micro or nano magnetic structures with magnetization in the plane of the magnetic structure with magnetization rotations on a length scale comparable to the lateral dimension of the surface of the magnetic structure. The magnetization vortex results from an equilibrium between magnetostatic energy and exchange energy for cylindrical or near-cylindrical shaped micro or nano structures in magnetic layers, for which the radius and thickness are sufficiently large. Depending on the geometry of the magnetic structure, the vortex configuration is the stable spin configuration with the lowest energy at remanent state.

In a stable vortex configuration, the vortex can be deformed reversibly without being cancelled. More particularly, the vortex can deform reversibly under a moderate magnetic field. The part of the vortex magnetization parallel to the applied field tends to become larger and the part of the magnetization antiparallel to the applied field tends to become smaller. This causes displacement of the vortex core along the direction transverse to the direction of the applied field. When the magnetic field is reduced, the vortex core gradually returns to its equilibrium position in zero field. The equilibrium position of the vortex core in the case of a disk-shaped microstructure or nanostructure is at the center of the disk.

Figure 1:
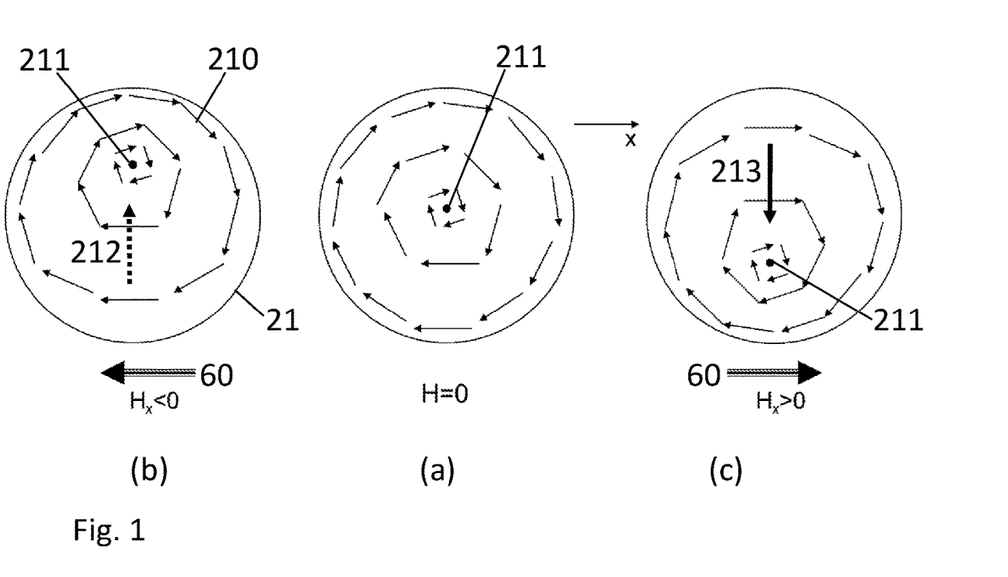
FIG. 1 shows a top view of a ferromagnetic layer having a magnetization comprising a vortex configuration.

FIGS. 1a to 1c illustrate a top view of a ferromagnetic layer 21 having a magnetization 210. The magnetization 210 represented by the arrows comprises a stable vortex configuration. More particularly, the vortex configuration has a vortex center, or vortex core 211, with out-of-plane magnetization and in-plane magnetization rotating around the vortex core 211 with a clockwise or counterclockwise direction. FIG. 1a represents the first magnetization vortex in the absence of an external magnetic field 60, with the vortex core 211 being substantially at a center of the first ferromagnetic layer cross-section. In this configuration, the first ferromagnetic layer 21 has a net magnetic moment that is substantially zero (H=0). Applying the external magnetic field 60 along an easy axis of the first ferromagnetic layer 21 (for example along the x direction), causes the vortex core 211 to move in a direction being substantially perpendicular to the easy axis of the first ferromagnetic layer 21. In FIG. 1b, the vortex core 211 moves in a first displacement direction (upwards in FIG. 1b) upon applying the external magnetic field in a first field direction $-H_x$ represented toward the left in the figure. The displacement in the first displacement direction (shown by the arrow 212) of the vortex core 211 (FIG. 1b) results in a net magnetic moment H<0 in the first ferromagnetic layer 21. FIG. 1c shows the vortex core 211 being moved in a second displacement direction (downwards in FIG. 1c) upon applying the external magnetic field in a second field direction $H_x$ opposed to the first field direction $-H_x$. The displacement of the vortex core 211 in the second displacement direction (shown by the arrow 213) results in a net magnetic moment H>0 in the first ferromagnetic layer 21.

The vortex configuration provides a linear and non-hysteretic behavior in a large magnitude range of the external magnetic field 60, for practical size of the magnetoresistive sensor element 2 and thickness of the sense layer 21. The vortex configuration is thus advantageous for 1D magnetic sensor applications.

Figure 2:
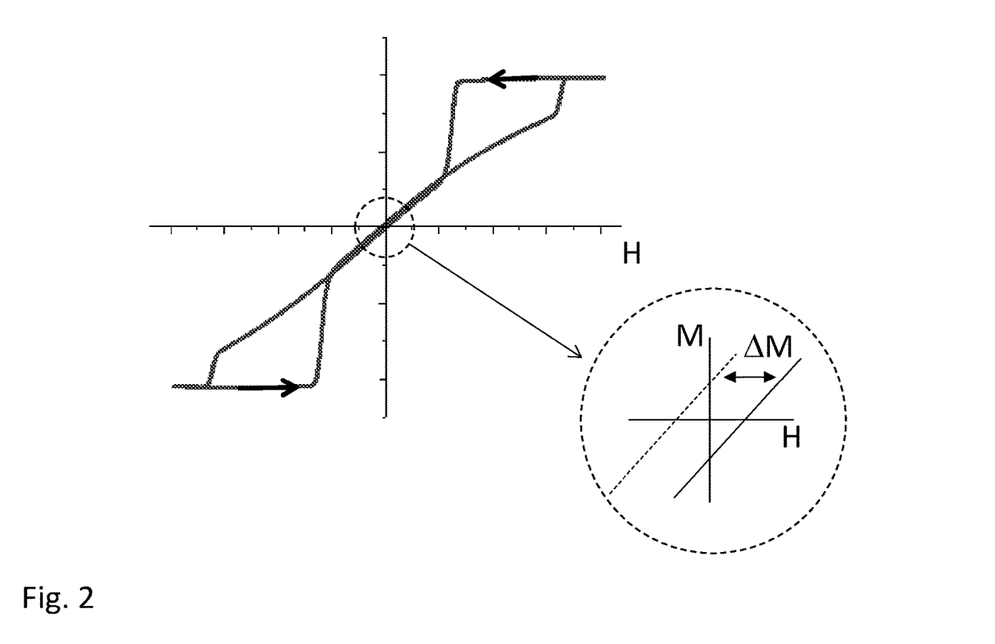
FIG. 2 represents a magnetization curve showing the variation in the magnetization of a ferromagnetic layer 1 under the effect of an external magnetic field.

A ferromagnetic layer having a magnetization comprising a vortex configuration exhibits a hysteresis observed when a high bias field is applied, on one or the other direction (at zero field strength, the magnetization is offset from the origin by an amount called the remanence). FIG. 2 represents a magnetization curve M-H showing the variation in the magnetization 210 of the ferromagnetic layer 21 under the effect of the external magnetic field 60. There is an offset $\Delta M_i$ between the M-H curve when the external magnetic field 60 is applied in the first field direction $-H_x$ compared to when the external magnetic field 60 is applied in the second field direction $H_x$. This intrinsic offset $\Delta M_i$ translates in a variation in the resistance of a magnetic tunnel junction comprising the ferromagnetic layer 21, as a function of the external magnetic field 60. It has been determined that the intrinsic offset $\Delta M_i$ (intrinsic to the ferromagnetic layer) is due to trapping and de-trapping of the vortex core into different defects comprised in the ferromagnetic layer 21, yielding to two different paths of displacement of the vortex core 211 in the first and second displacement directions 212, 213.

The intrinsic offset $\Delta M_i$ is detrimental for sensors based on magnetic element comprising the ferromagnetic layer 21 since it decreases the measurement range allowed by such sensors.

WO2020217195 discloses a magnetic element comprising a first ferromagnetic layer having a first magnetization comprising a stable magnetization vortex configuration having a vortex core. The first ferromagnetic layer comprises an indentation configured such that the vortex core nucleates substantially at the indentation. Upon application 5 of an external magnetic field in a first field direction ($-H_x$), the vortex core moves along a first path and the first magnetization rotates around the vortex core in a counter-clockwise direction. Upon application of the external magnetic field in a second field direction ($H_x$) opposed to the first field direction, the vortex core moves along a 10 second path and the first magnetization rotates around the vortex core in a clockwise direction. Both the first and second field path are substantially identical and move the vortex core away from the indentation.

SUMMARY

The present disclosure concerns a magnetic sensor device comprising a plurality of magnetic sensor elements; each magnetic sensor element comprising a magnetic tunnel junction including a reference layer having a reference magnetization, a sense layer having a sense magnetization and a tunnel barrier layer between the reference layer and the sense layer. The sense magnetization comprises a stable vortex configuration in the absence of an external magnetic field. The vortex has a core reversibly movable in a plane of the sense layer according to an external magnetic field. The sense layer comprises a peripheral shape in the plane, the peripheral shape comprising an asymmetric edge portion. The magnetic sensor elements are arranged such that the edge portion of a magnetic sensor element is opposite to the edge portion of the adjacent magnetic sensor element.

The magnetic sensor device disclosed herein allows for reducing the intrinsic offset $\Delta M_i$ of each magnetic sensor element and the averaged offset $\Delta M_a$ of the plurality of magnetic sensor elements. The magnetic sensor device has increased measurement range compared to conventional magnetic sensor devices. Measurement range can be above the vortex cancellation field, or expulsion field such that no hysteresis is observed when a high bias field is applied.

SHORT DESCRIPTION OF THE DRAWINGS

Exemplar embodiments of the invention are disclosed in the description and illustrated by the drawings in which.

EXAMPLES OF EMBODIMENTS

Figure 3:
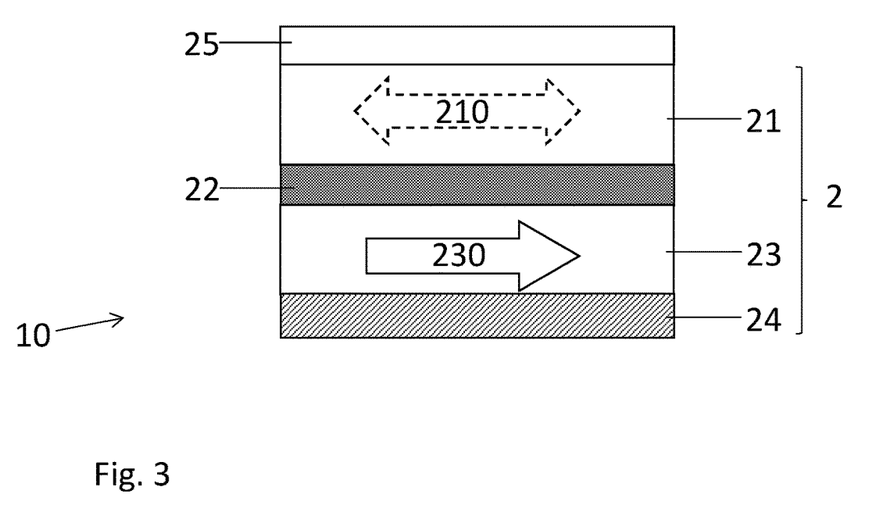
FIG. 3 shows a cross-section side view of a magnetic sensor element, according to an embodiment.

FIG. 3, shows a cross-section side view of a magnetic sensor element 10 comprising a magnetic tunnel junction 2. The magnetic tunnel junction 2 comprises a reference layer 23 having a reference magnetization 230, a sense layer 21 having a sense magnetization 210, and a tunnel barrier layer 22 between the reference layer 23 and the sense layer 21. The sense magnetization 210 is configured to be orientable in an external 25 magnetic field 60 while the orientation of the reference magnetization 230 remain unchanged. The resistance of the magnetic sensor element 10 depends on the sense magnetization 210 relative to the reference magnetization 230. For example, when the sense magnetization 210 is parallel to the reference magnetization 230 the resistance of the magnetic sensor element 10 is low (logic state "0"). When the sense magnetization 210 is antiparallel to the reference magnetization 230 the resistance of the magnetic sensor element 10 is high (logic state "1").

The sense and reference layers 21, 23 can be made of a ferromagnetic material such as Fe based alloy, CoFe, NiFe or CoFeB. Optionally, the reference layer 23 can be pinned by an antiferromagnetic layer 24 by magnetic exchange bias coupling. The antiferromagnetic layer can comprise an alloy based on manganese Mn, such as alloys based on iridium Ir and Mn (e.g., IrMn); alloys based on Fe and Mn (e.g., FeMn); alloys based on platinum Pt and Mn (e.g., PtMn); and alloys based on Ni and Mn (e.g., NiMn). The reference layer 23 can comprise one or a plurality of ferromagnetic layers or a synthetic antiferromagnet (SAF). The tunnel barrier 22 can comprise an insulating material. Suitable insulating materials include oxides, such as aluminum oxide (e.g., $Al_2O_3$) and magnesium oxide (e.g., MgO). A thickness of the tunnel barrier layer 22 can be in the nanometer (nm) range, such as from about 1 nm to about 3 nm. The magnetic sensor element 10 can further comprises a capping layer 25, for example an electrode.

Figure 4:
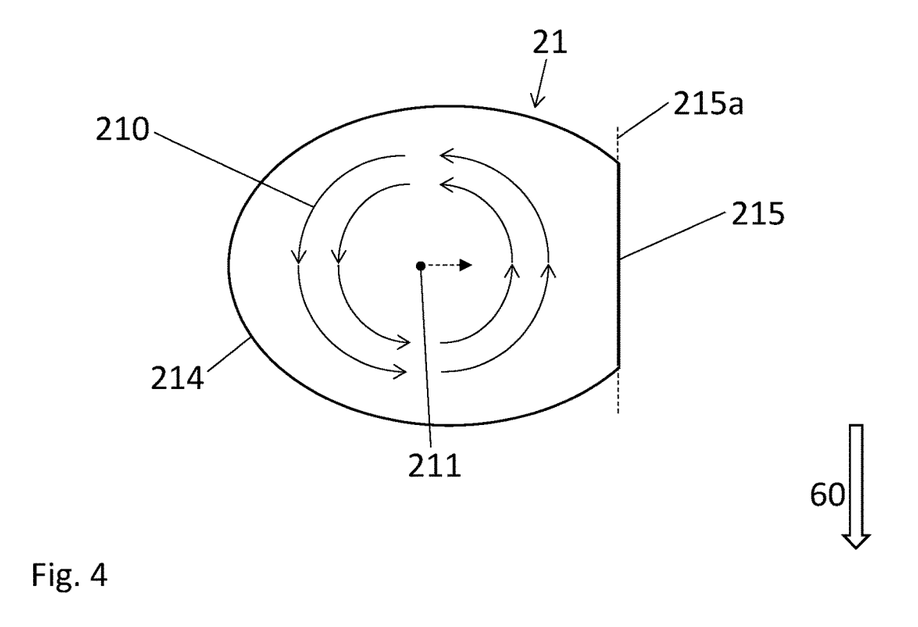
FIG. 4 illustrates a top view of the magnetic sensor element showing the sense layer comprising a flat edge portion, according to an embodiment.

FIG. 4 is a top view of magnetic sensor element 10 showing the sense layer 21. The sense magnetization 210 comprises a stable vortex configuration in the absence of an external magnetic field. The vortex has a core 211 that is reversibly movable in a plane P of the sense layer 21 according to an external magnetic field 60. The sense layer 21 has a peripheral shape 214 and is provided with an asymmetric edge portion 215.

The edge portion 215 can comprise a substantially flat edge formed by partially cutting out the periphery of the sense layer 21 at one side of the peripheral shape 214.

In the example of FIG. 4, the peripheral shape 214 comprises a substantially elliptical shape in the plane P. The edge portion 215 comprises a substantially flat edge formed by partially cutting out the periphery of the sense layer 21 at one side of the peripheral shape 214, along the major axis.

The peripheral shape 214 can have an elliptical shape aspect ratio (or eccentricity) between 1 and 2. Note that the peripheral shape 214 need not be circular or elliptical but can have other shapes such as square or rectangular.

Figure 5:
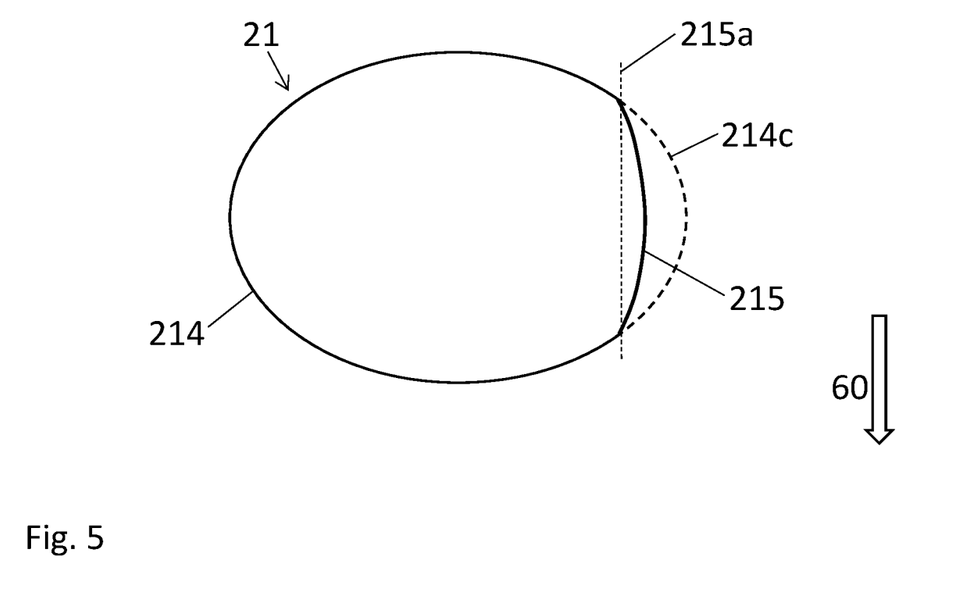
FIG. 5 illustrates a top view of the magnetic sensor element showing the sense layer comprising a convex edge portion, according to an embodiment.
Figure 6:
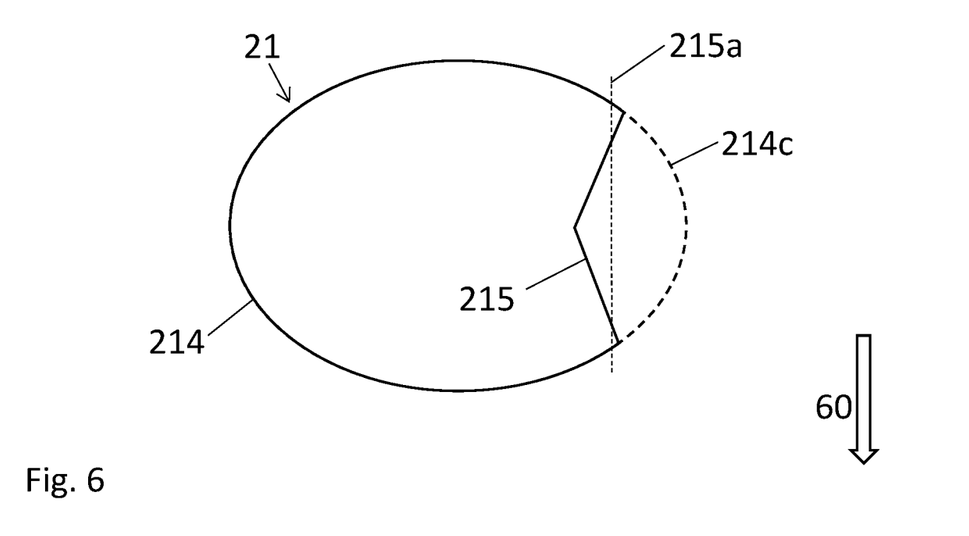
FIG. 6 illustrates a top view of the magnetic sensor element showing the sense layer comprising a triangular edge portion, according to an embodiment.

In one aspect illustrated in FIG. 5, the edge portion 215 comprises a convex peripheric portion having a radius that is larger than the radius of the cut-out portion 214a of the peripheral shape 214. The edge portion 215 can further comprise a concave peripheric portion (not shown). The concave peripheric portion can have a radius that is smaller or larger than the radius of the cut-out portion 214a. The edge portion 215 can comprise any other asymmetric edge shape, such as a circular, triangular or square notch. FIG. 6 shows the peripheral shape 214 of the sense layer 21 having a triangular edge portion 215.

In a preferred embodiment, the edge portion 215 is provided at one side of the peripheral shape 214, substantially perpendicular to an easy axis of the sense layer 21. In the example of FIG. 4, the easy axis corresponds to the major axis of the elliptical peripheral shape 214.

The edge portion 215 can be oriented substantially parallel to the orientation of the external magnetic field 60. For example, the sense layer 21 can be arranged such that the external magnetic field 60 is oriented substantially parallel to the edge portion 215. In FIGS. 4 to 6, the orientation of the edge portion 215 is shown by the dotted line 215a.

Figure 7:
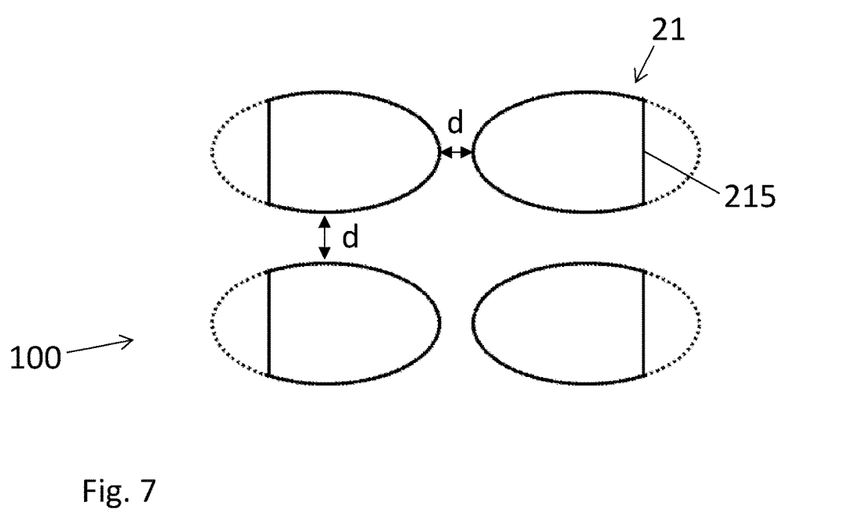
FIG. 7 shows a magnetic sensor device comprising a plurality of the magnetic sensor elements, according to an embodiment.

In an embodiment, a magnetic sensor device comprises a plurality of the magnetic sensor elements 10. FIG. 7 schematically shows a top view of a magnetic sensor device comprising a subarray 100 of four magnetic sensor elements 10. The magnetic sensor device can comprise any number of magnetic sensor elements 10 but at least two magnetic sensor elements 10. The magnetic sensor elements 10 are arranged such that the edge portion 215 of a magnetic sensor element 10 is opposite to the edge portion 215 of the adjacent magnetic sensor elements 10.

The presence of the edge portion 215 in the sense layer 21 induces an off-centred vortex core 211 which induces a hysteresis, or an intrinsic offset $\Delta M_i$ at zero field strength. The intrinsic offset $\Delta M_i$ due to the presence of the edge portion 215 can reach about ±20 Oe, depending on the direction of the external magnetic field 60.

Figure 8:
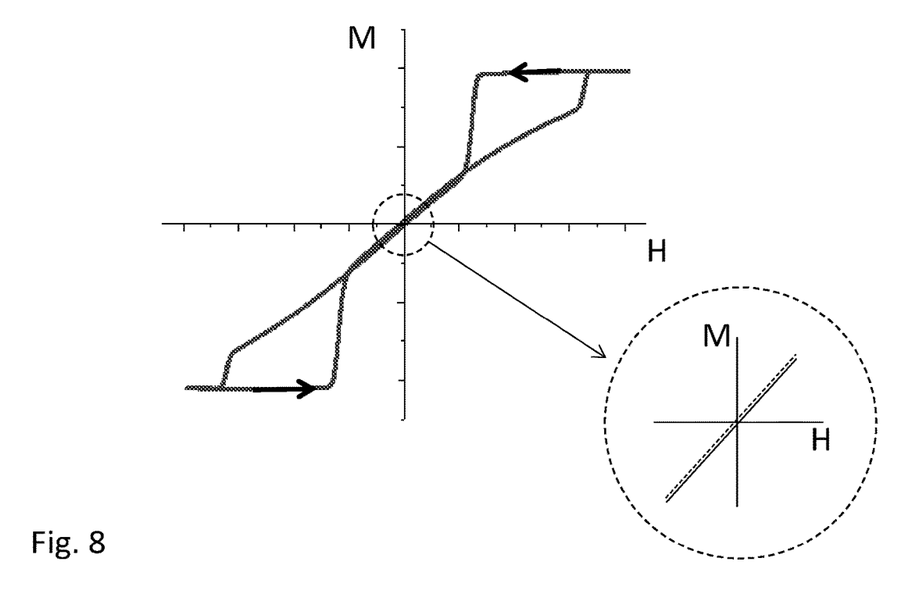
FIG. 8 represents a magnetization curve showing the variation in the magnetization of the sense layer under the effect of the external magnetic field, averaged for the plurality of magnetic sensor elements in the magnetic sensor device.

FIG. 8 represents a magnetization curve M-H showing the variation in the magnetization 210 of the sense layer 21 under the effect of the external magnetic field 60, averaged for the plurality of magnetic sensor elements 10 in the magnetic sensor device. In the magnetic sensor device of FIG. 7, the opposite arrangement of the edge portion 215 allows to compensate the intrinsic offsets $\Delta M_i$ of the two adjacent magnetic sensor elements 10 such that an averaged offset $\Delta M_a$ of the magnetic sensor device is substantially null.

Preferably, the magnetic sensor elements 10 are arranged in a regular array, for example arranged in a plurality of rows and at least one column wherein in each row, the edge portion 215 of a magnetic sensor element 10 is opposite to the edge portion 215 of the adjacent magnetic sensor element 10.

In some aspects, a distance d between two adjacent magnetic sensor elements 10 is between 10 nm and 50 nm. The distance d allows to maximize the magnetostatic interaction between adjacent sensor element 10. The magnetostatic interaction between two adjacent magnetic sensor elements 10 increases with diminishing distance d.

Figure 9:
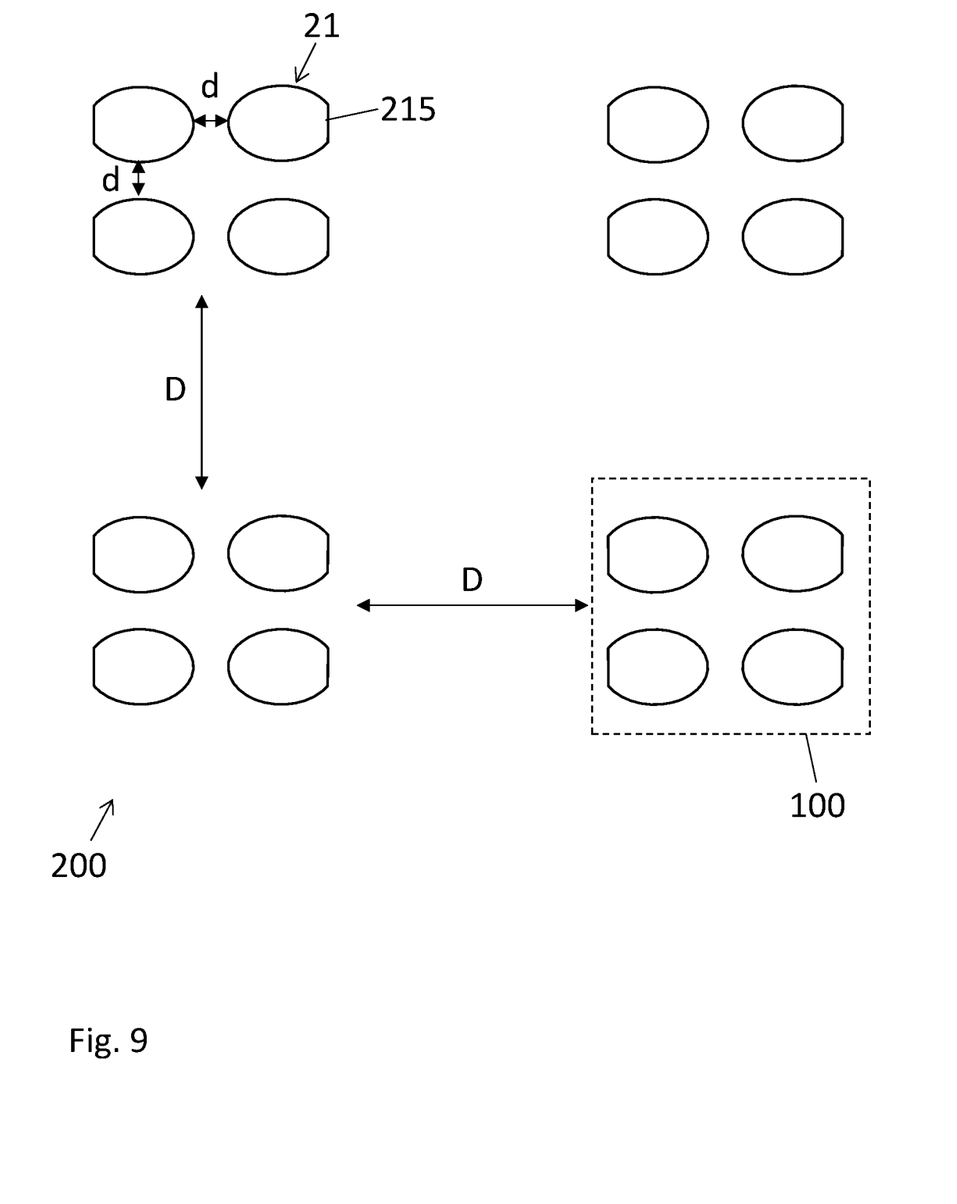
FIG. 9 shows a magnetic sensor device comprising a plurality of the magnetic sensor elements, according to another embodiment.

In an embodiment show in FIG. 9, magnetic sensor device can comprise a regular array 200 comprising a plurality of subarrays 100 comprising magnetic sensor elements 10 arranged such as shown in FIG. 7. The distance D between two adjacent subarrays 100 should be equal or greater than about 1 micrometer (µm). This distance D should be large enough to avoid magnetic interaction between a subarray 100 and the other subarrays 100. In other words, thew distance D should allow a subarray 100 to be magnetically isolated from the other subarrays 100.

The magnetic sensor device 100 disclosed herein allows for increasing the measurement range and avoiding 2-vortex configurations. A two-vortex configuration consists of two vortices in a magnetic sensor element. It is generally a stable configuration for circular of elliptical sensor elements with large radius (or small axis) and a thick sense layer. The measurement range can be above the expulsion field of the vortex such that no hysteresis is observed when a high bias field is applied. Only field limitation left will be associated to the SAF reference layer 23. In other words, the field limitation will be associated to possible modification of magnetization in the SAF for high fields (rotation of uniform magnetization is SAF for high magnetic fields). The arrangement of the magnetic sensor elements 10 in the array 200, or subarray 100) reduces the averaged offset $\Delta M_a$ by recentering the vortex core 211 at zero field in each magnetic sensor element 10.

The edge portion 215 may further result in the first and second displacement directions 212, 213 of the vortex core 211 (see FIG. 1) to be substantially identical, as described in European patent application No. EP 3731230. The entirety of the above-mentioned patent application is hereby incorporated by reference herein. The intrinsic offset $\Delta M_i$ due to the presence of the edge portion 215 can be reduced for each magnetic sensor element 10, thus further increasing the measurement range of the magnetic sensor device 100.

REFERENCE NUMBERS AND SYMBOLS 10 magnetic sensor element
100 subarray
2 magnetic tunnel junction
200 array
21 reference layer
210 sense magnetization
211 core
212 displacement of the vortex core
213 displacement of the vortex core
214 peripheral shape
214c cut-out portion
215 edge portion
215a orientation of the edge portion
22 tunnel barrier layer
23 reference layer
230 reference magnetization
25 capping layer
60 external magnetic field
$\Delta M_a$ averaged offset
$\Delta M_i$ intrinsic offset
d distance between two adjacent magnetic sensor elements
D distance between two adjacent subarrays

The invention claimed is:

1. A magnetic sensor device comprising a plurality of magnetic sensor elements;

each magnetic sensor element comprising a magnetic tunnel junction including a reference layer having a reference magnetization, a sense layer having a sense magnetization and a tunnel barrier layer between the reference layer and the sense layer;

the sense magnetization comprising a stable vortex configuration in the absence of an external magnetic field, the vortex having a core reversibly movable in a plane of each sense layer according to an external magnetic field;

the sense layer comprising a peripheral shape in the plane (P), the peripheral shape comprising a single asymmetric edge portion;

wherein the plurality of magnetic sensor elements comprise at least a first magnetic sensor element and a second magnetic sensor element, wherein the first magnetic sensor element and the second magnetic sensor element are adjacent to one another, and wherein the first magnetic sensor element and the second magnetic sensor element are arranged so that the single asymmetric edge portion of the first magnetic sensor element is facing away from the second magnetic sensor element, and the single asymmetric edge portion of the second magnetic sensor element is facing away from the first magnetic sensor element, so that the single asymmetric edge portion of the first magnetic sensor element is opposite to the single asymmetric edge portion of the second magnetic sensor element, and wherein the distance between the first magnetic sensor element and the second magnetic sensor element is such that the magnetostatic interaction between the first magnetic sensor element and the second magnetic sensor element is so that the intrinsic offsets $\Delta M_i$, of the first and second magnetic sensor elements are compensated, such that an averaged offset $\Delta M_a$ of the magnetic sensor device is substantially null.

2. The magnetic sensor device according to claim 1, wherein the single asymmetric edge portion of the first and second magnetic sensor elements is formed by partially cutting out the periphery of a ferromagnetic layer of the sense layer at one side of the peripheral shape.

3. The magnetic sensor device according to claim 2, wherein the single asymmetric edge portion of the first and second magnetic sensor elements comprises a substantially flat edge.

4. The magnetic sensor device according to claim 2, wherein the single asymmetric edge portion of the first and second magnetic sensor elements comprises any one of a convex peripheric portion, a concave peripheric portion, or a circular, triangular or square notch.

5. The magnetic sensor device according to claim 1, wherein the single asymmetric edge portion of the first and second magnetic sensor elements is provided substantially perpendicular to an easy axis of the sense layer.

6. The magnetic sensor device according to claim 1, wherein the peripheral shape comprises an elliptical shape in the plane having an aspect ratio between 1 and 2.

7. The magnetic sensor device according to claim 6,
wherein the elliptical shape has an eccentricity greater than 1; and
wherein the single asymmetric edge portion of the first and second magnetic sensor elements is cut along the major axis.

8. The magnetic sensor device according to claim 1, comprising a regular subarray including a plurality of rows and at least one column of the magnetic sensor elements,
wherein in each row, the edge portion of a magnetic sensor element is opposite to the single asymmetric edge portion of the adjacent magnetic sensor element.

9. The magnetic sensor device according to claim 1, wherein a distance between two adjacent magnetic sensor elements is between 10 nm and 50 nm.

10. The magnetic sensor device according to claim 8, comprising an array including a plurality of subarrays.

11. The magnetic sensor device according to claim 10, wherein a distance between two adjacent subarrays is equal or greater than 1 pm.

12. The magnetic sensor device according to claim 6,
wherein the elliptical shape has an eccentricity greater than 1; and
wherein the single asymmetric edge portion of the first and second magnetic sensor elements is cut along the major axis.

* * * * *